(12) United States Patent
Kobold

(10) Patent No.: US 11,653,125 B1
(45) Date of Patent: May 16, 2023

(54) METHOD OF COLLECTING FIELD-BASED DATA TO REDUCE COLLECTED-DATA ERROR

(71) Applicant: United States of America as represented by the Secretary of the Navy, Arlington, VA (US)

(72) Inventor: Michael Kobold, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 286 days.

(21) Appl. No.: 17/233,125

(22) Filed: Apr. 16, 2021

(51) Int. Cl.
*H04Q 9/00* (2006.01)

(52) U.S. Cl.
CPC .......... *H04Q 9/00* (2013.01); *H04Q 2209/10* (2013.01); *H04Q 2209/40* (2013.01); *H04Q 2209/756* (2013.01)

(58) Field of Classification Search
CPC .. H04Q 9/00; H04Q 2209/10; H04Q 2209/40; H04Q 2209/756
See application file for complete search history.

(56) References Cited

U.S. PATENT DOCUMENTS

| | | | |
|---|---|---|---|
| 6,400,305 B1* | 6/2002 | Kuhn | G01S 7/022 455/228 |
| 2004/0068365 A1* | 4/2004 | Sanchez Peiro | H04Q 9/00 455/423 |
| 2017/0350238 A1* | 12/2017 | Werkheiser | E21B 47/12 |

* cited by examiner

*Primary Examiner* — Manuel A Rivera Vargas
(74) *Attorney, Agent, or Firm* — James T. Shepherd

(57) ABSTRACT

A data collection method uses a receiver having data collection sensitivity to signals originating from objects dispersed in a field that is subject to distortion. The sensitivity of the receiver is swept along a first arc. For each of the objects detected during the sweeping step, two of the signals are collected at two different points in time. A difference between the two signals is compared to a threshold. When the difference exceeds the threshold, the sensitivity of the receiver is re-swept along a second arc that is angularly less than the first arc. When the difference is less than the threshold, the signals are captured.

26 Claims, 5 Drawing Sheets

METHOD OF COLLECTING FIELD-BASED DATA TO REDUCE COLLECTED-DATA ERROR

ORIGIN OF THE INVENTION

The invention described herein may be manufactured and used by or for the Government of the United States of America for Governmental purposes without payment of any royalties.

FIELD OF THE INVENTION

The invention relates generally to data collection, and more particularly to a method for reducing error in data collected from a field that is subject to distortion.

BACKGROUND OF THE INVENTION

Considerable amounts of error are frequently introduced into "data" that is measured or collected from stationary points and objects, and/or moving objects in a three-dimensional "field" (i.e., environment) subject to flow and distortion. The flow can be miniscule yet still accumulate to cause error in the measured/collected data due to non-uniform flow, especially between a point or object at one time versus its measurement/collection at a later time.

The "data" can be the state of a particle in the field (such as temperature or color), or visual images and/or acoustic signals collected by remotely-located sensors/detectors where the images/signals are to be indicative of the location of moving objects or targets in a three-dimensional fluid field, e.g., the sea or the atmosphere. The "data" can also be packets of communication signals, in their physical layer form (optical or acoustic oscillation) transmitted from and/or through a three-dimensional field subject to time-of-flight distortion where particles in the field move during the collection of the data. The "data" can also be transmissions from data collection sensors/detectors located at positions estimated or assumed to be stationary within a field that is subject to distortion over time caused by flow, object self-propulsion, and other energy(ies). In each case, the introduced errors cascade and compound with time thereby greatly lowering confidence in the collected data.

In the field of fluid flow, a particle is a patch or volume of the fluid that is small enough to assume that its properties are constant within the (small) volume of the particle. The measurement of a particle of a fluid uses the Lagrangian view of flow as opposed to the Eulerian view. In a Lagrangian view of data collected from a fluid, data measurements follow individual fluid parcels as the fluid moves through space and time. In an Eulerian view, the collection of data occurs at specific locations in the space through which the fluid flows as time passes.

Many measurement systems occur in an Eulerian model. However, measurements of drifting objects, that follow the flow of a fluid through a field, continue through their varying collection locations in a Lagrangian sense. For example, environmental data collection can involve the logging of a temperature or color datum at a particle in the field at a particular time as well as other data and their time/location for each datum. However, the spatial relationship between data experiencing distortion because of flow in the field, which can be minute, can suffer substantial relative changes.

The conventional method of producing distorted-field data is to attempt to collect the data within as short a time period as possible. Accuracy of the field measurement increases with decreases in the time between data measurements. On a microscopic level, it is impossible to provide a zero-error field measurement of more than one particle in the fluid if a single sensor collects the data. While, in theory, an infinite number of sensors would provide an accurate field value for the environmental measurement at all points at one instant in time, this is not a practical solution or even truly theoretically possible due to Einstein's theory of special relativity. Further, distortion is rarely uniform since the time-of-flight for measurement notification increases with distance from a receiver. Thus, field-based data measurement efforts continually seek to manage field distortion error for the available number of sensors and realistic time segments for data collection.

SUMMARY OF THE INVENTION

Accordingly, it is an object of the present invention to provide a method of collecting data from a field subject to distortion.

Another object of the present invention is to provide a method of collecting field-based data that reduces errors in the collected data.

Other objects and advantages of the present invention will become more obvious hereinafter in the specification and drawings.

In accordance with the present invention, a data collection method uses a receiver having a data collection sensitivity to signals originating from objects dispersed in a field that is subject to distortion. The sensitivity of the receiver is swept along a first arc. For each of the objects detected during the sweeping step, two of the signals are collected at two different points in time. A difference between the two signals is compared to a threshold. When the difference exceeds the threshold, the sensitivity of the receiver is re-swept along a second arc that is angularly less than the first arc. When the difference is less than the threshold, the signals are captured.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
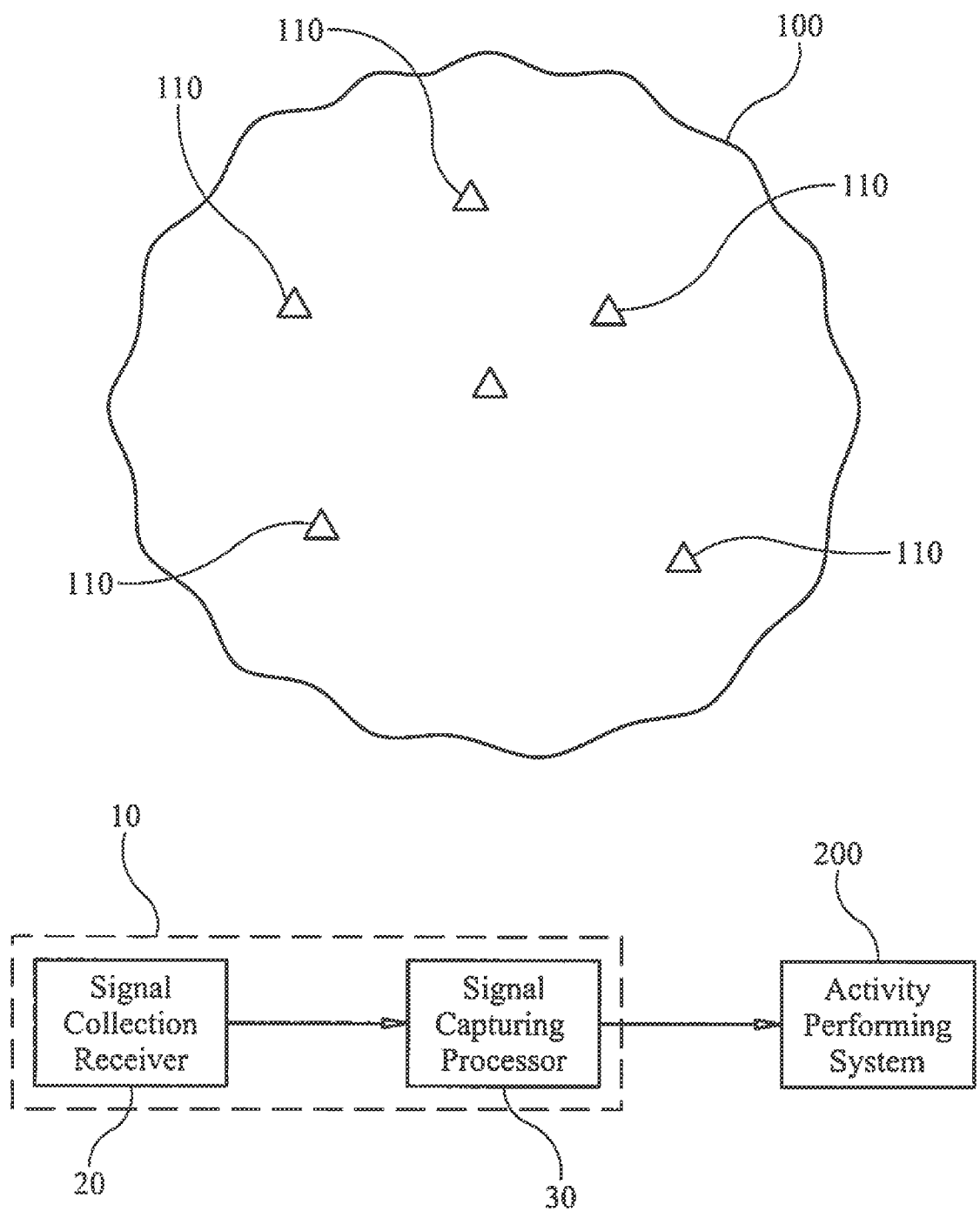
FIG. 1 is a schematic view of a system used in the collection of field-based data in accordance with an embodiment of the present invention.

Referring now to the drawings and more particularly to FIG. 1, a schematic view of a system used in the collection of field-based data in accordance with an embodiment of the present invention is contained within the dashed-line box referenced by numeral 10. The "field" from which data is to be collected is referenced by numeral 100. In general, field 100 is some three-dimensional fluid environment such as air or water. As is the case with most fluid environments, field 100 is subject to distortion energy due to one or more of, for example, inherent distortion cause by environmental currents in field 100, inherent distortion caused by environmental wave energy moving through field 100, induced distortion caused by energetic sources that impact field 100, induced distortion caused by objects moving in field 100, etc. Regardless of the nature(s) of the distortion, the present invention provides a method for collecting data from field 100 that reduces error in the collected data brought on by distortion(s) in field 100.

System 10 includes a signal collection receiver 20 and a signal capturing processor 30. The hardware devices/systems used for receiver 20 and processor 30 will vary depending on the type of data being collected. For example, if the data to be collected is optical or video data, receiver 20 can include optical devices/systems, camera(s), and/or illuminator types of devices/systems to include LEDs and lasers used in LADAR or LIDAR devices/systems where the collected data can be images, time/distance measurements, etc. If the data to be collected is acoustic data, receiver 20 can include a variety of acoustic sensors or sensor arrays, sonar systems, etc. If the data to be collected is electromagnetic communications data, receiver 20 can include antenna-based receivers, radar systems, etc. In a similar fashion, processor 30 includes hardware compatible with signal collection receiver 20 such that data of interest can be properly processed and captured. The captured data can ultimately be provided to some activity performing system 200 that utilizes the collected data in any of a variety of processes that are not part of, and do not limit, the present invention.

Dispersed throughout field 100 are a number of objects 110 that can be the source of a signal to be collected. As used herein, the term "object" can refer to, for example, moving or stationary physical objects of interest in field 100, moving or stationary sensors/transmitters located in field 100, etc. In addition, an "object" as used herein can also refer to the signals themselves that are to be collected such as communication signal packets transmitted in/through field 100. In either case, signals associated with objects 110 that are being collected are subject to distortion-induced error as a function of time. That is, the error or uncertainty in the signals' efficacy increases with time between data collections. The present invention provides a method for collecting field-based data having acceptable levels of distortion-induced error.

Figure 3:
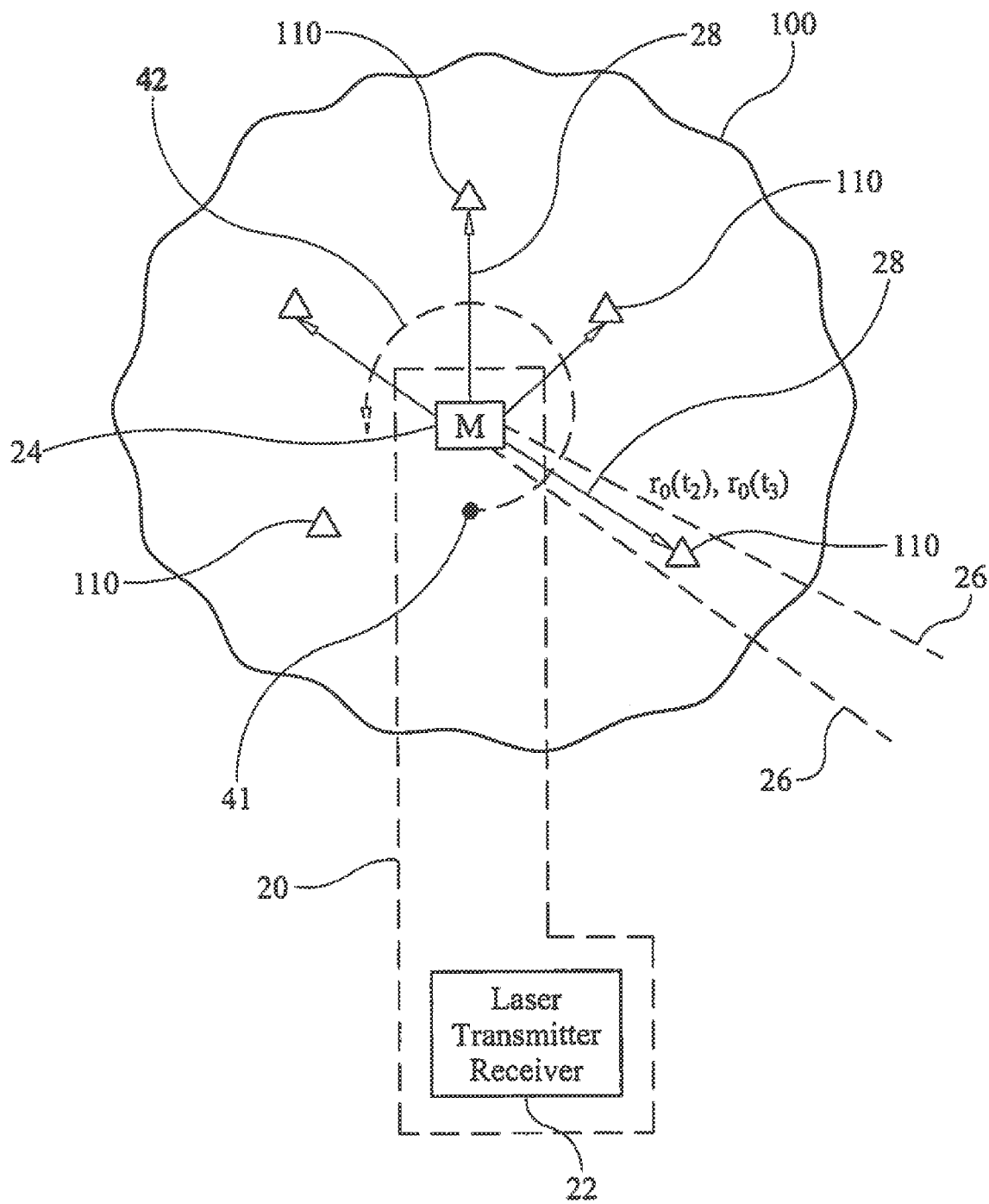
FIG. 3 is a diagrammatic view of a secondary and shorter arc sweep of the field after the initial sweep of the field in accordance with an embodiment of the present invention.
Figure 4:
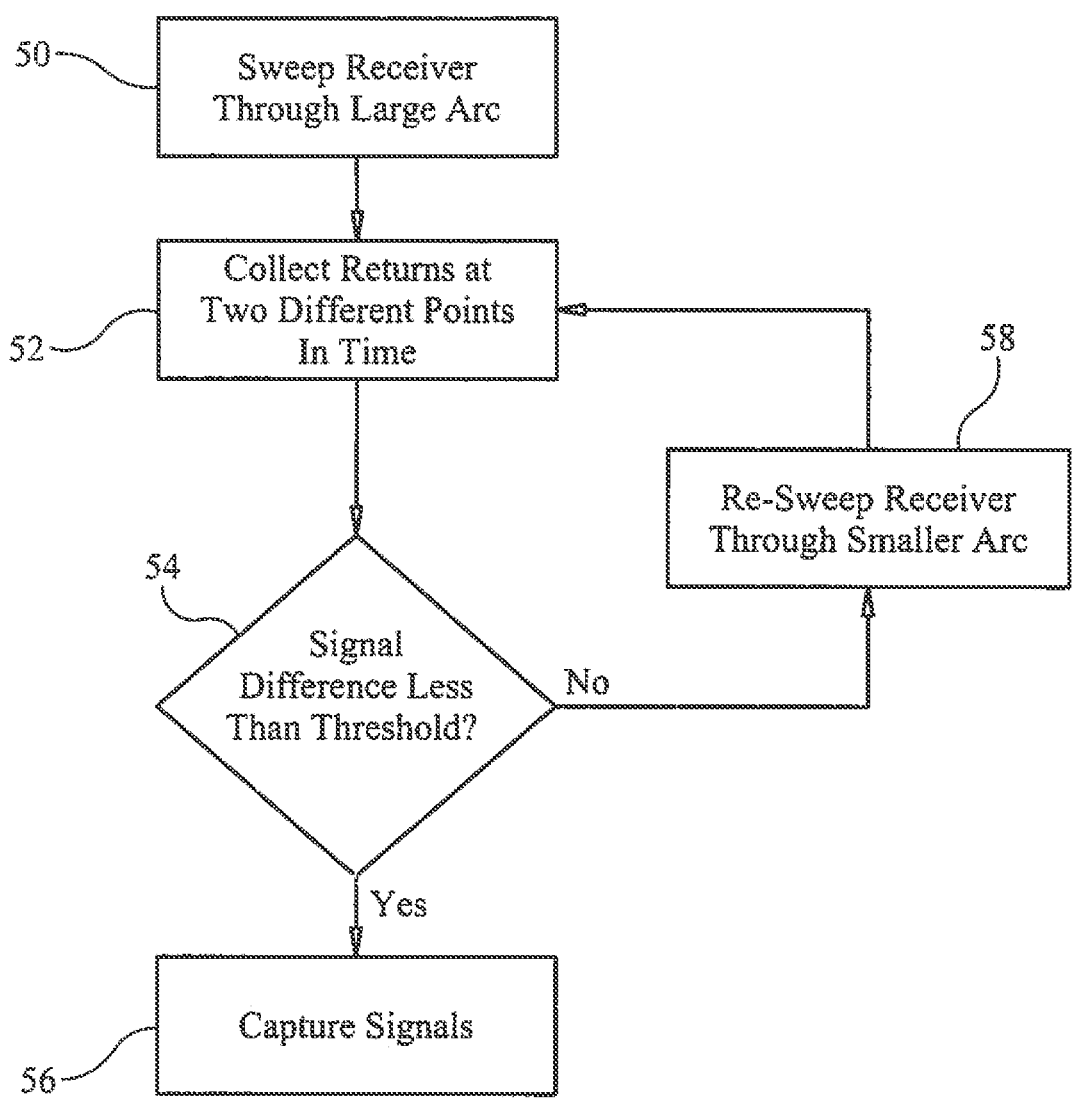
FIG. 4 is a flow diagram of the process steps for collecting field-based data in accordance with an embodiment of the present invention.

The novel aspects of the present invention can be adapted for use in collecting a variety of types of field-based data. By way of a non-limiting illustrative example, the novel aspects of the present invention will now be explained with reference to FIGS. 2-4. For the illustrated example, the above-described signal collection receiver 20 is a laser-based system that includes a laser transmitter/receiver 22 and a scanning mirror ("M") 24 that can be disposed in field 100. Transmitter/receiver 22 can be a co-located monostatic arrangement or a separated bi-static arrangement without departing from the scope of the present invention. In either case, transmitter/receiver 22 transmits an interrogation signal, in this case a laser beam, towards scanning mirror 24 whose movement (e.g., rotation) is controlled such that the laser beam reflects from mirror 24 as it is swept through a prescribed arc. The scanned/swept laser beam generates a return signal upon engagement with an object 110 with the return signal being transmitted back to transmitter/receiver 22 via mirror 24. Thus, at any given time, transmitter/receiver 22 has what will be referred to herein as a data collection sensitivity to objects 110 falling within the receiver's sensitivity region (i.e., the region defined between dashed lines 26) predicated on the position of mirror 24. Each such laser beam transmission/engagement/return occurring within region 26 is indicated by vectors 28. The construction and operation of such laser-based systems are well-known in the art and, therefore, will not be described further herein.

For sake of simplicity, the present invention will be described for a two-dimensional field 100. In such a case and as will be described further below, the data collection sensitivity of transmitter/receiver 22 is swept through an arc lying in a plane. For a three-dimensional field 100, the present invention will include tilting of the swept arc out of the two-dimensional plane thereof as would be understood by one of ordinary skill in the art.

Figure 2:
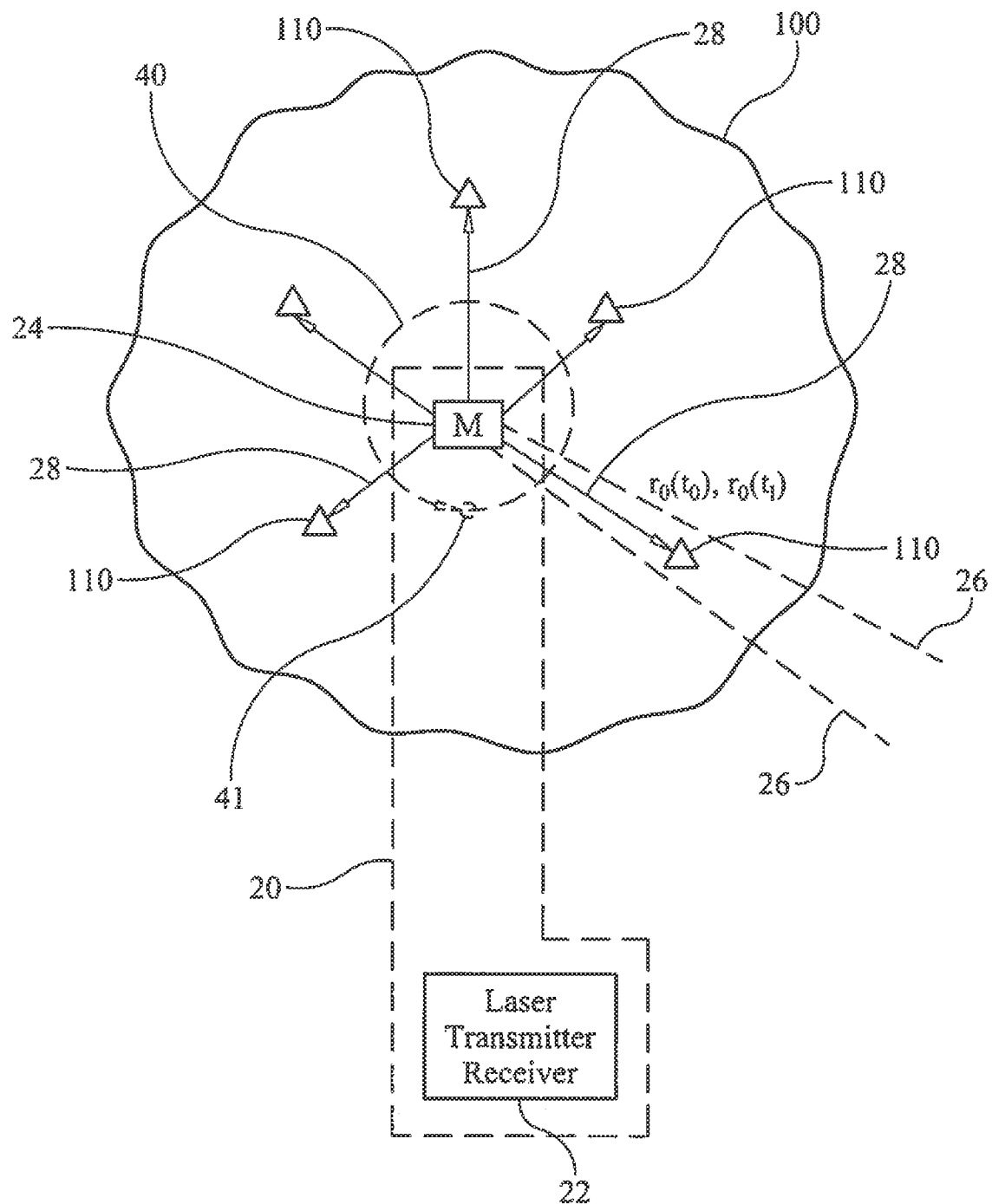
FIG. 2 is a diagrammatic view of an initial sweep of a field that is subject to distortion in accordance with an embodiment of the present invention.

The process of the present invention begins with step 50 where transmitter/receiver 22 and mirror 24 are operated to sweep the transmitted laser beam through field 100 in a large arc such as a full 360° arc or circle indicated by dashed-line 40. In other words, the data collection sensitivity of receiver 20 is swept along arc 40. When a smaller arc is used for the same collection time, resolution and sensitivity of the system increase. The sweep can commence at any angular origination (e.g., indicated by point 41 in the illustrated embodiment) and can be controlled to be an analog sweep or a digitally incremented sweep without departing from the scope of the present invention. The sweep can proceed in a clockwise or counterclockwise direction as illustrated in FIG. 2.

For each object 110 detected, step 52 involves collection of a return signal associated with the object at two different points in time. For example and as shown in FIG. 2, a return signal $r_0$ for an object 110 is collected at times $t_0$ and $t_1$. In one embodiment, $t_0$ can be indicative of an initial sweep along arc 40 and $t_1$ can be indicative of a second sweep along arc 40. The time-separated signals are provided to processor 30 where a difference therebetween is compared at step 54. When the time difference $(t_1-t_0)$ is relatively small, the difference in signal value at the two times is predominantly dictated by the distortion in field 100.

The difference between the time-separated signals is compared to a threshold that, in general, is application-specific. The threshold can be fixed or adaptable, and can be user-defined or algorithmically generated without departing from the scope of the present invention. However, in all cases, the threshold essentially defines an acceptable level of field-distortion-induced error for the application. Accordingly, when the difference between the two time-separated signals is less than the threshold thereby indicating that the error is within the acceptable range, step 56 captures the two signals. However, if the difference between the two signals exceeds the threshold thereby indicating that the error level is unacceptable, receiver 20 is controlled to essentially reduce the time between two collected signals associated with objects 110.

The reduction in time between signals being collected by receiver 20 is accomplished in the present invention by controlling receiver 20 to perform a re-sweep or scan of a region of field 100. More specifically and as illustrated diagrammatically in FIG. 3, step 58 re-sweeps the data collection sensitivity of receiver 20 through an arc 42 that is less than arc 40, thus providing greater resolution. By way of a non-limiting example, arc 42 is a 270° arc. Arc 42 can have the same angular origination 41 as arc 40 (as shown) or can have a different angular origination than that of arc 40 without departing from the scope of the present invention. In the same fashion as the sweep along arc 40, the value of return signal $r_0$ is collected (at step 52) during two sweeps along arc 42 at times $t_2$ and $t_3$ where the time difference $(t_3-t_2)$ will be less than the time difference $(t_1-t_0)$ owing to the angular reduction between arcs 40 and 42. By increasing the dwell per unit angle, so do the resolution and sensitivity of the system. The above-described difference comparison step 54 is then repeated and the signals are either captured at step 56 or the sweep arc is further reduced and re-sweep step 58 is repeated.

Figure 5:
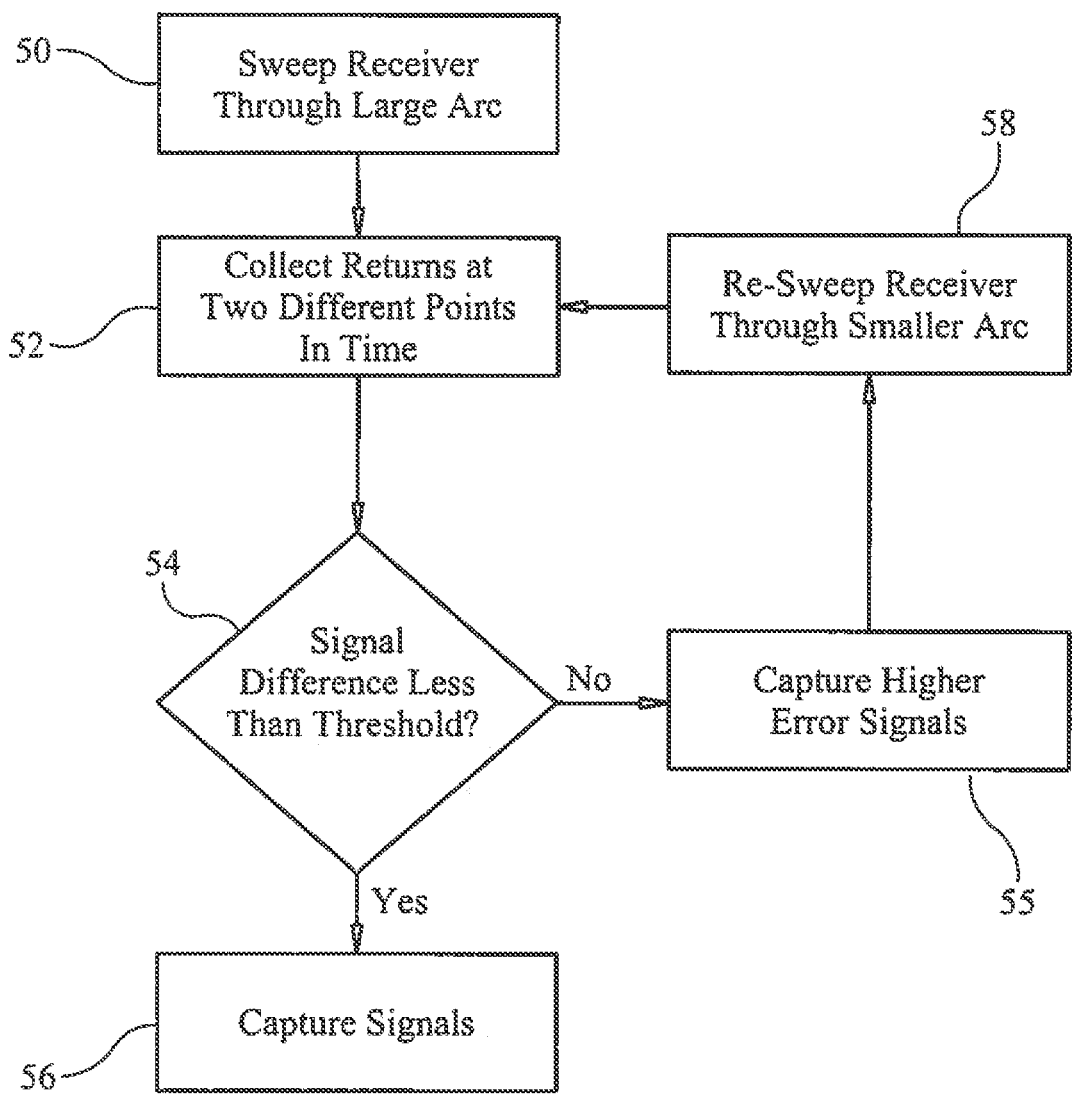
FIG. 5 is a flow diagram of the process steps for collecting field-based data in accordance with another embodiment of the present invention.

In other embodiments of the present invention, an additional capture step 55 can be included as shown in the process flow illustrated in FIG. 5. Capture step 55 involves the capture of the higher error signals when the signal difference comparison at step 54 indicates that the above-described threshold is exceeded. The higher error signals can sometimes be used to improve statistical metrics for smaller data sets. Following capture step 55, processing proceeds to re-sweep step 58 as described above.

The advantages of the present invention are numerous. The above-described sweep/re-sweep approach to field-based data collection is a simple and efficient way to collect data commensurate with an acceptable level of distortion error. The method is readily adaptable to data collection across a variety of technologies tasked with collecting such data from a field that experiences distortion due to inherent and/or induced energies. The method is readily adaptable to technologies monitoring stationary or moving objects, and those which passively collect data or send out interrogation signals to generate a return signal when an object is encountered. The error-acceptable collected data can then be provided to an activity performing system that is reliant on error-acceptable data.

Although the invention has been described relative to specific embodiments thereof, there are numerous variations and modifications that will be readily apparent to those skilled in the art in light of the above teachings. For example, applications of the present invention related to communications will rely on a data collection sensitivity such as a phase which is a function of time. The phase offset between signals that travel different trajectories through a field is the accumulation of deviations from synchronization. The present invention would be adapted to constrain the phase in order to provide sufficient angular phase $2\pi f(dt)$ in radians or $f(dt)$ in degrees where the frequency, f, is in cycles per second, specifically 360 degrees per second. The time difference, called the 'delay,' is dt. The signals appear in the expression A cosine $(\omega t+\varphi)$ where $\omega=2\pi f$ is the angular speed in radians per second, or degrees per $2\pi$ seconds. For many communications applications, the variation in trajectory also imposes a variation in frequency due to the Doppler effect. The combination of Doppler and delay provides classification features to help identify the received signals that arrive from separate trajectories. The present invention limits the number of trajectories. This limitation on the radians or degrees of phase of delay works the same as the spatial angle limits defined in the previous embodiment of the invention, thereby providing a collection of signals to combine for a message.

It is therefore to be understood that, within the scope of the appended claims, the invention may be practiced other than as specifically described.

What is claimed as new and desired to be secured by Letters Patent of the United States is:

1. A data collection method, comprising the steps of:
   providing a receiver having a data collection sensitivity to signals originating from objects dispersed in a field that is subject to distortion;
   sweeping said sensitivity of said receiver along a first arc;
   collecting, for each of the objects detected during said step of sweeping, two of said signals at two different points in time;
   comparing a difference between said two signals to a threshold;
   re-sweeping, when said difference exceeds said threshold, said sensitivity of said receiver along a second arc that is angularly less than said first arc; and
   capturing said signals when said difference is less than said threshold.

2. A data collection method according to claim 1, wherein said signals comprise at least one of audio-based signals, electromagnetic-based signals, and video-based signals.

3. A data collection method according to claim 1, wherein said receiver comprises a receiver array.

4. A data collection method according to claim 1, wherein said first arc comprises a 360° arc.

5. A data collection method according to claim 1, wherein said first arc and said second arc have a common origin.

6. A data collection method according to claim 1, wherein said first arc and said second arc have unique origins.

7. A data collection method according to claim 1, wherein said steps of sweeping and re-sweeping include the step of transmitting an interrogation signal into the field wherein, when said interrogation signal engages with one of the objects, one of said signals is generated.

8. A data collection method according to claim 1, wherein the objects are moving in the field.

9. A data collection method according to claim 1, further comprising the step of capturing said signals when said difference is greater than said threshold.

10. A data collection method, comprising the steps of:
    providing a receiver having a data collection sensitivity to signals originating from a field that is a three-dimensional fluid environment;
    sweeping said sensitivity of said receiver in increments along a first arc;
    collecting, for each of said increments along said first arc, two of said signals at two different points in time;
    comparing a difference between said two signals to a threshold;
    re-sweeping, when said difference exceeds said threshold, said sensitivity of said receiver in increments along a second arc that is angularly less than said first arc; and
    capturing said signals when said difference is less than said threshold.

11. A data collection method according to claim 10, wherein said signals comprise at least one of audio-based signals, electromagnetic-based signals, and video-based signals.

12. A data collection method according to claim 10, wherein said receiver comprises a receiver array.

13. A data collection method according to claim 10, wherein said first arc comprises a 360° arc.

14. A data collection method according to claim 10, wherein said first arc and said second arc have a common origin.

15. A data collection method according to claim 10, wherein said first arc and said second arc have unique origins.

16. A data collection method according to claim 10, wherein said steps of sweeping and re-sweeping include the step of transmitting an interrogation signal into the field wherein, when said interrogation signal engages with an object in the field, one of said signals is generated.

17. A data collection method according to claim 16, wherein the object is moving in the field.

18. A data collection method according to claim 10, further comprising the step of capturing said signals when said difference is greater than said threshold.

19. A data collection method, comprising the steps of:
providing a receiver having a data collection sensitivity to signals originating from a field that is a three-dimensional fluid environment;
sweeping said sensitivity of said receiver in increments along a circle;
collecting, for each of said increments along said circle, two of said signals at two different points in time;
comparing a difference between said two signals to a threshold;
re-sweeping, when said difference exceeds said threshold, said sensitivity of said receiver in increments along an arc of said circle; and
capturing said signals when said difference is less than said threshold.

20. A data collection method according to claim 19, wherein said signals comprise at least one of audio-based signals, electromagnetic-based signals, and video-based signals.

21. A data collection method according to claim 19, wherein said receiver comprises a receiver array.

22. A data collection method according to claim 19, wherein said circle and said arc have a common origin.

23. A data collection method according to claim 19, wherein said circle and said arc have unique origins.

24. A data collection method according to claim 19, wherein said steps of sweeping and re-sweeping include the step of transmitting an interrogation signal into the field wherein, when said interrogation signal engages with an object in the field, one of said signals is generated.

25. A data collection method according to claim 24, wherein the object is moving in the field.

26. A data collection method according to claim 19, further comprising the step of capturing said signals when said difference is greater than said threshold.

\* \* \* \* \*